United States Patent
Oulès et al.

(10) Patent No.: US 11,430,486 B1
(45) Date of Patent: Aug. 30, 2022

(54) PROVISION OF SUPPLEMENTAL CONTENT FOR USE IN A VIDEO EDIT

(71) Applicant: GOPRO, INC., San Mateo, CA (US)

(72) Inventors: Guillaume Oulès, Bordeaux (FR); Anaïs Oulès, Bordeaux (FR); Jonathan Leland Thorn, San Leandro, CA (US); Joshua Druker, Redwood City, CA (US)

(73) Assignee: GoPro, Inc., San Mateo, CA (US)

( * ) Notice: Subject to any disclaimer, the term of this patent is extended or adjusted under 35 U.S.C. 154(b) by 0 days.

(21) Appl. No.: 17/345,958

(22) Filed: Jun. 11, 2021

(51) Int. Cl.
| | |
|---|---|
| *G11B 27/036* | (2006.01) |
| *G11B 27/34* | (2006.01) |
| *G06F 16/787* | (2019.01) |
| *G11B 27/034* | (2006.01) |
| *G06F 16/735* | (2019.01) |
| *G06F 16/78* | (2019.01) |

(52) U.S. Cl.
CPC .......... *G11B 27/036* (2013.01); *G06F 16/735* (2019.01); *G06F 16/787* (2019.01); *G06F 16/7867* (2019.01); *G11B 27/034* (2013.01); *G11B 27/34* (2013.01)

(58) Field of Classification Search
None
See application file for complete search history.

(56) References Cited

U.S. PATENT DOCUMENTS

| | | | | |
|---|---|---|---|---|
| 8,644,685 | B2 * | 2/2014 | Kamotani | G11B 27/34 386/278 |
| 11,049,525 | B2 * | 6/2021 | Huber | G11B 27/031 |
| 2008/0112684 | A1 * | 5/2008 | Matsushita | G11B 27/28 386/278 |
| 2011/0026898 | A1 * | 2/2011 | Lussier | G06F 3/04842 386/280 |
| 2012/0057852 | A1 * | 3/2012 | Devleeschouwer | H04N 5/262 386/278 |
| 2013/0227415 | A1 * | 8/2013 | Gregg | G11B 27/031 715/723 |
| 2013/0343729 | A1 * | 12/2013 | Rav-Acha | G11B 27/329 386/285 |
| 2017/0229147 | A1 * | 8/2017 | McKaskle | H04N 21/41407 |
| 2018/0204597 | A1 * | 7/2018 | Rav-Acha | G11B 27/031 |

* cited by examiner

*Primary Examiner* — Gelek W Topgyal
(74) *Attorney, Agent, or Firm* — Esplin & Associates, PC

(57) ABSTRACT

A list of supplemental media items may be provided to potentially include one or more supplemental media items in a sequence of media items. For example, a list of B-roll footage may be provided to a user creating a video edit, and the video edit may be modified to include the B-roll footage selected by the user. The list of B-roll footage may include B-roll footage that is suggested for inclusion in the video edit.

20 Claims, 5 Drawing Sheets

PROVISION OF SUPPLEMENTAL CONTENT FOR USE IN A VIDEO EDIT

FIELD

This disclosure relates to providing supplemental content for use in a video edit.

BACKGROUND

Users creating edits of media items may lack media items that provide a certain view of one or more things. For example, users on a trip may have recorded video clips that are personal to them, but may have failed (e.g., due to lack of access/proper equipment/time/knowledge) to record video clips (e.g., B-roll) that include shots that are more general in nature (e.g., iconic shots of a location). It may be desirable to include such general shots in a video edit to provide a more full/comprehensive view in the video edit. For example, such general shots may be included in the video edit to balance the pace of the video edit, add diversity of shots to the video edit, provide background for title, and/or provide other supplemental views in the video edit.

SUMMARY

This disclosure relates to providing supplemental content for use in a video edit. A sequence of media items may be obtained. The sequence of media items may include media items ordered in a sequence. A list of supplemental media items for potential inclusion in a location in the sequence of media items may be provided. The list of supplemental media items may include one or more supplemental media items that provide a view of one or more things not provided by the sequence of media items. A selection of at least one of the supplemental media item(s) for inclusion in the location in the sequence of media items may be obtained. The sequence of media items may be modified to include at least one of the supplemental media item(s) selected for inclusion in the location in the sequence of media items.

A system that provides supplemental content for use in a video edit may include one or more electronic storage, one or more processors, and/or other components. The electronic storage may store information relating to media items, information relating to a sequence of media items, information relating to supplemental media items, information relating to a list of supplemental media items, information relating to selection of supplemental media items, information relating to modification of a sequence of media items, and/or other information.

The processor(s) may be configured by machine-readable instructions. Executing the machine-readable instructions may cause the processor(s) to facilitate providing supplemental content for use in a video edit. The machine-readable instructions may include one or more computer program components. The computer program components may include one or more of a media component, a supplemental media component, a selection component, a modification component, and/or other computer program components.

The media component may be configured to obtain a sequence of media items. The sequence of media items may include media items ordered in a sequence.

The supplemental media component may be configured to provide a list of supplemental media items for potential inclusion in a location in the sequence of media items. The list of supplemental media items may include one or more supplemental media items that provide a view of one or more things not provided by the sequence of media items.

In some implementations, the supplemental media item(s) may be identified for inclusion in the list of supplemental media items based on context of one or more of the media items in the sequence of media items that are adjacent to the location in the sequence of media items.

In some implementations, the supplemental media item(s) may be identified for inclusion in the list of supplemental media items based on context of one or more of the media items in the sequence of media items that are not adjacent to the location in the sequence of media items responsive to an insufficient number of supplemental media items being identified for inclusion in the list of supplemental media items based on the context of the one or more of the media items in the sequence of media items that are adjacent to the location in the sequence of media items.

In some implementations, context of a given media item may include a capture time and/or a capture geo location. In some implementations, the context of the given media item may further include an environmental condition during capture of the given media item. In some implementations, the context of the given media item may further include visual content and/or audio content of the given media item.

In some implementations, a given supplemental media item may be identified for inclusion in the list of supplemental media items based on context of the given supplemental media item filling one or more gaps in context of the media items in the sequence of media items.

In some implementations, the list of supplemental media items may be changed based on user selection of one or more filters. A list of filters available for the user selection may be determined based on a privilege associated with a user and/or other information.

In some implementations, multiple sources of supplemental media items may exist. Which ones of the multiple sources of supplemental media items are searched for identification of the supplemental media item(s) for inclusion in the list of supplemental media items may be determined based on a privilege associated with a user and/or other information.

The selection component may be configured to obtain a selection of at least one of the supplemental media item(s) for inclusion in the location in the sequence of media items.

The modification component may be configured to modify the sequence of media items. The sequence of media items may be modified to include at least one of the supplemental media item(s) selected for inclusion in the location in the sequence of media items.

In some implementations, at least one of the supplemental media item(s) selected for inclusion in the location in the sequence of media items may be automatically modified to match one or more characteristics of at least one of the media items in the sequence of media items.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
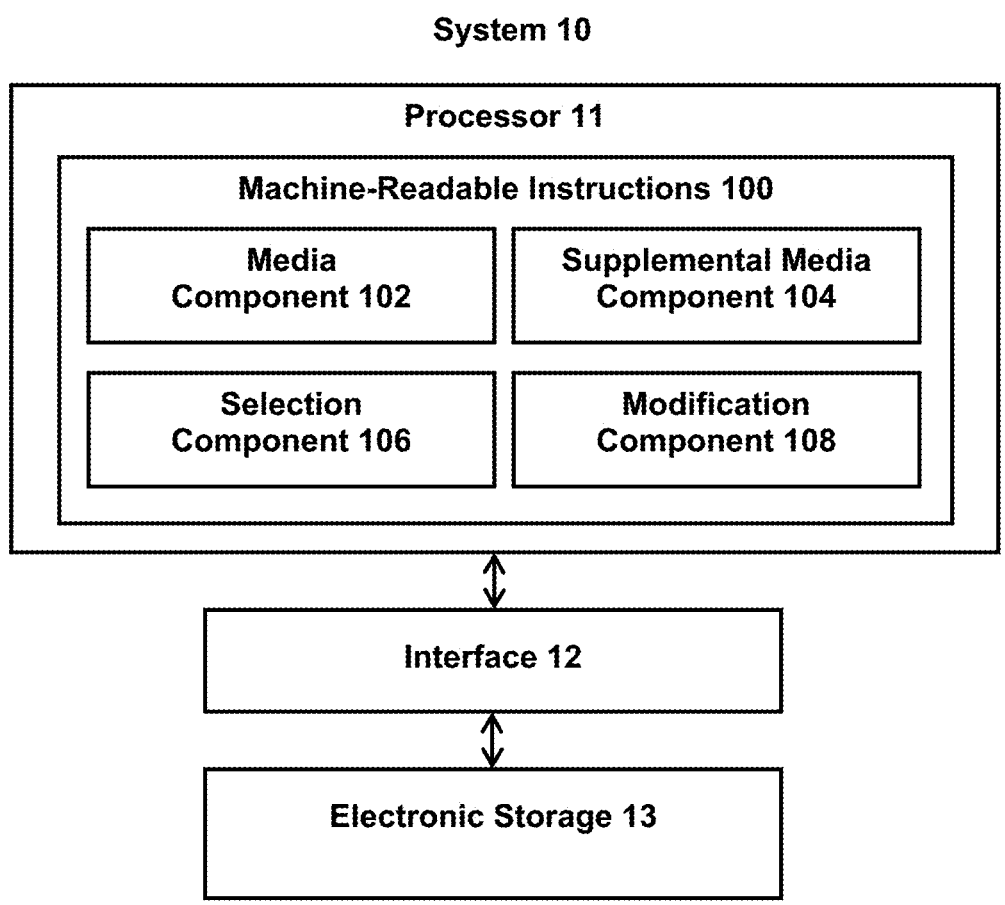
FIG. 1 illustrates a system that provides supplemental content for use in a video edit.

FIG. 1 illustrates a system 10 for providing supplemental content for use in a video edit. The system 10 may include one or more of a processor 11, an interface 12 (e.g., bus, wireless interface), an electronic storage 13, and/or other components. A sequence of media items may be obtained by the processor 11. The sequence of media items may include media items ordered in a sequence. A list of supplemental media items for potential inclusion in a location in the sequence of media items may be provided by the processor 11. The list of supplemental media items may include one or more supplemental media items that provide a view of one or more things not provided by the sequence of media items. A selection of at least one of the supplemental media item(s) for inclusion in the location in the sequence of media items may be obtained by the processor 11. The sequence of media items may be modified by the processor 11 to include at least one of the supplemental media item(s) selected for inclusion in the location in the sequence of media items.

The electronic storage 13 may be configured to include electronic storage medium that electronically stores information. The electronic storage 13 may store software algorithms, information determined by the processor 11, information received remotely, and/or other information that enables the system 10 to function properly. For example, the electronic storage 13 may store information relating to media items, information relating to a sequence of media items, information relating to supplemental media items, information relating to a list of supplemental media items, information relating to selection of supplemental media items, information relating to modification of a sequence of media items, and/or other information.

The processor 11 may be configured to provide information processing capabilities in the system 10. As such, the processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. The processor 11 may be configured to execute one or more machine readable instructions 100 to facilitate providing supplemental content for use in a video edit. The machine-readable instructions 100 may include one or more computer program components. The machine-readable instructions 100 may include one or more of a media component 102, a supplemental media component 104, a selection component 106, a modification component 108, and/or other computer program components.

The media component 102 may be configured to obtain one or more media items. Obtaining a media item may include one or more of accessing, acquiring, analyzing, determining, examining, generating, identifying, loading, locating, opening, receiving, retrieving, reviewing, selecting, storing, and/or otherwise obtaining the media item. The media component 102 may obtain a media item from one or more locations. For example, the media component 102 may obtain a media item from a storage location, such as the electronic storage 13, electronic storage of information and/or signals generated by one or more sensors, electronic storage of a device accessible via a network, and/or other locations. The media component 102 may obtain a media item from one or more hardware components and/or one or more software components.

In some implementations, the media component 102 may obtain a media item based on user interaction with a user interface/application (e.g., video editing application, video player application), and/or other information. For example, a user interface/application may provide option(s) for a user to generate a media presentation (e.g., video edit). A media item may be obtained based on the user's selection of the media item for inclusion in the media presentation. Other selections of media item for retrieval of media item are contemplated.

A media item may refer to an item that may be visually and/or audibly consumed. A media item may refer to a multimedia item. For example, a media item may include an image, a video, a sound clip, and/or other media item. The media item(s) may be obtained as a set of media items. A set of media items may refer to a grouping of media items. A set of media items may include one or more media items. For example, the media item(s) may be obtained as a set of media items that are to be included in a media presentation. The media items may be order in a sequence of media items (e.g., by a user, by a computing system, such as based on a video editing template or automatic video editing process).

The media item(s) may be obtained as a sequence of media items. A sequence of media items (media sequence) may refer to an arrangement of media items. A sequence of media items may refer to an ordering of media items. A sequence of media items may refer to a particular order in which media items are arranged/follow each other. A sequence of media items may include media items ordered in a sequence. A sequence of media items may include (define) a sequence (a particular arrangement/order) of media items. For example, a sequence of media items may refer to an arrangement/order of media items to be included in a media presentation. For example, a sequence of media items may be generated to include a particular arrangement of one or more images, one or more videos, and/or other media items for playback. For example, a sequence of media items may refer to a video edit that include one or more images, one or more videos, and/or other media items arranged in a particular sequence.

Figure 3A:
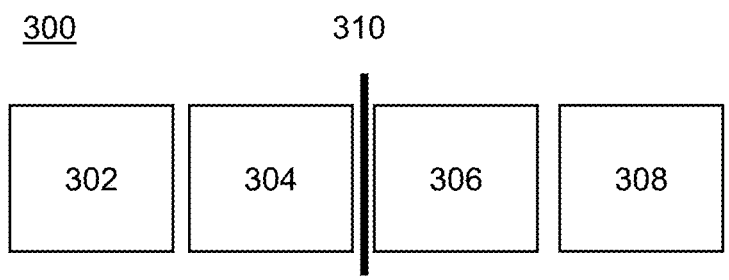
FIG. 3A illustrates an example sequence of media items.

FIG. 3A illustrates an example sequence of media items 300. The sequence of media items 300 may include a media item 302, followed by a media item 304, followed by a media item 306, followed by a media item 308. In some implementations, the view of the sequence of media items 300 shown within FIG. 3A may be presented within a graphical user interface or a display. The view of the sequence of media items 300 may be shown to provide visual representation of media items that are included in the sequence of media items 300. In some implementations, the view of the sequence of media items 300 may provide thumbnail representations of the media items. A thumbnail representation of a media item may provide a visual representation of the content of the media item. Thumbnail representation of a media item may be generated from the content of the media item. For instance, individual media items may be shown with a thumbnail generated from the content of the individual media items (e.g., thumbnail generated from a video frame of a video clip).

Figure 3B:
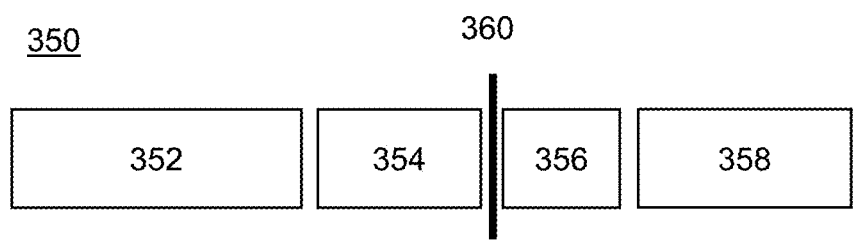
FIG. 3B illustrates an example sequence of media items.

FIG. 3B illustrates an example sequence of media items 350. The sequence of media items 350 may include a media item 352, followed by a media item 354, followed by a media item 356, followed by a media item 358. In some implementations, the view of the sequence of media items 350 shown within FIG. 3B may be presented within a graphical user interface or a display. The view of the sequence of media items 350 may be shown to provide visual representation of media items that are included in the sequence of media items 350. In some implementations, the view of the sequence of media items 350 may provide timeline representations of the media items. A timeline representation of a media item may provide a visual representation of the length of the media item. The size of the timeline represent may indicate the length of the media item (original length of the media item, the length the media item takes up in the media presentation). Larger size may indicate longer length and smaller size may indicate shorter length.

The supplemental media 104 component may be configured to provide a list of supplemental media items for potential inclusion in a location in the sequence of media items. Providing a list of supplemental media items may include generating, preparing, presenting, making available for use, and/or otherwise providing the list of supplemental media items. The list of supplemental media items may be provided to a user for user selection of one or more supplemental media items for inclusion in the location at the sequence of media items. The list of supplemental media items may be provided to a tool (e.g., video editing engine/tool/software) for computer selection of one or more supplemental media items for inclusion in the location at the sequence of media items.

A location in the sequence of media items may refer to a place, a position, and/or other location in the sequence of media items. A location in the sequence of media items may refer to a place, a position, and/or other location in the sequence of media items. A location in the sequence of media items may include the beginning location (before all media items), the ending location (after all media items), or an intermediate location (e.g., between two of the media items).

For example, referring to FIG. 3A, a list of supplemental media items may be provided for potential inclusion in a location 310 in the sequence of media items 300. The location 310 may be selected by a user or by a computer. The location 310 may follow the media item 304 and precede the media item 306. Referring to FIG. 3B, a list of supplemental media items may be provided for potential inclusion in a location 360 in the sequence of media items 350. The location 360 may be selected by a user or by a computer. The location 360 may follow the media item 354 and precede the media item 356.

A supplemental media item may refer to a media item that provides a view of one or more things (e.g., living thing, non-living thing, an object, an environment, a scene, an activity) not provided by the sequence of media items (by the media items in the sequence of media items). A supplemental media item may refer to a media item that provides an additional view to the views provided by the media items in the sequence of media items. A supplemental media item may refer to a media items that provides an alternate view to the views provided by the media items in the sequence of media items. A supplemental media item may refer to a media item that enhances the views provided by the media items in the sequence of media items. In some implementations, a supplemental media item may be referred to as B-roll. In some implementations, media items that provides views of things that likely will not be captured by users of an image capture device may be gathered/maintained/identified as supplemental media items. That is, one or more groups of media items may be gathered/maintained/identified as supplemental media items to be offered based on the media items in the group(s) including views of thing that are likely to be not captured by users (e.g., maintaining footage of B-roll).

The list of supplemental media items may include one or more supplemental media items that provide a view of thing(s) not provided by the sequence of media items. The list of supplemental media items may identity supplemental media item(s) that provide a view of thing(s) not provided by the sequence of media items. The list of supplemental media items may provide a listing of supplemental media item(s) that are suggested for inclusion in the location at the sequence of media items.

Figure 4:
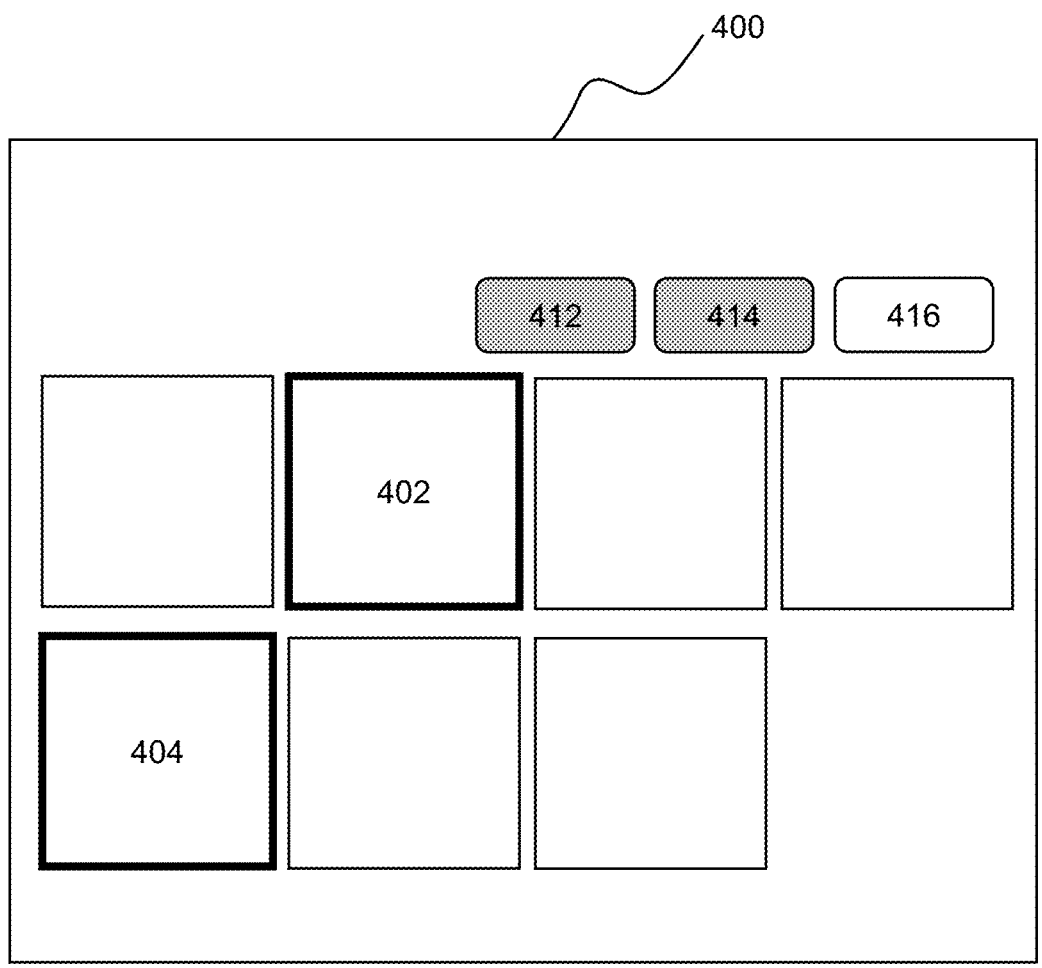
FIG. 4 illustrates an example selection of supplemental media items.

FIG. 4 illustrates an example graphical user interface 400. The graphical user interface 400 may include a list of seven supplemental media items, with individual supplemental media item represented by a square icon. Other presentation of the list of supplemental media items are contemplated. The graphical user interface 400 may include filter icons 412, 414, 416. The filter icons 412, 414, 416 may indicate which filters are being used to identify the supplemental media items to be listed within the graphical user interface 400. For example, the darker color of the filter icons 412, 414 may indicate that the two corresponding filters have been applied to the available supplemental media items, and the seven supplemental media items listed within the graphical user interface 400 may meet/satisfy the two corresponding filters. The lighter color of the filer icon 416 may indicate that the corresponding filter has not been applied in filtering the supplemental media items for listing. A user may interact with the filter icons 412, 414, 416 to turn on/off the corresponding filters.

In some implementations, the supplemental media item(s) may be identified for inclusion in the list of supplemental media items based on duration of the supplemental media item(s), duration of media items in the sequence of media items, duration to be filled in the sequence of media items, and/or other information. In some implementations, the supplemental media item(s) may be identified for inclusion in the list of supplemental media items based on context of the media items in the sequence of media items, and/or other information. Context of a media item may refer to circumstances and/or conditions of the thing(s) captured within the media item (e.g., what was captured within a video clip). Context of a media item may refer to circumstances and/or conditions in which the media item was generated (e.g., how a video clip was captured/recorded, circumstances and/or conditions of the image capture device during capture of the media item).

In some implementations, the context of a media item may include a general type of content captured within the media item. For example, the context of a media item may include whether the content captured within the media item is an action type, a setting type, a social type, and/or other types. An action type may refer to the context of the media item in which one or more actions (e.g., sports, activities) are captured within the media item. An action type context of the media item may indicate that action aspects of the media item are of interest to users. A setting type may refer to the context of the media time in which one or more settings (e.g., traveling, landmarks, sceneries) are captured within the media item. A setting type context of the media item may indicate that setting aspects of the media items are of interest to users. A social type may refer to the context of the media item which one or more social events (e.g., social setting/gathering) are captured within the media item. A social type context of the media item may indicate that social aspects of the media items are of interest to users. Use of other types of content captured within the media as context of the media items is contemplated.

In some implementations, the context of a media item may include content (e.g., visual content, audio content) of the media items. For example, the context of a media item may include identification of specific thing(s) captured within the media item. For instance, the context of a media item may include identification of a scene/scenery captured within the media item, identification of an activity captured within the media item, identification of an object/person captured within the media item, and/or other identification of thing(s) captured within the media item. In some implementations, the context of a media item may include metadata of the media item.

In some implementations, the context of a media item may include capture motion of the media item, content motion of the media item, and/or other motion. The capture motion of the media item may include motion of one or more image capture devices that captured the media item during capture. The capture motion may include motion of the image capture device(s) at a time, over a duration of time, at a location, or over a range of locations. Motion of an image capture device may include linear (translational) and/or angular (rotational) motion of the image capture device. For example, capture motion may include one or more of linear speed, angular speed, linear acceleration, angular acceleration, linear direction, and/or angular direction of image capture device(s) during capture of the media item. In some implementations, capture motion may include a direction of gravity on the image capture device(s) during capture. The direction of gravity may indicate the motion of the image capture device(s) with respect to gravity during capture of the media item (e.g., motion away from direction of gravity, motion towards direction of gravity). For instance, capture motion may include an image capture device being thrown during capture of the media item. Other capture motions are contemplated.

The content motion of the media item may include motion of one or more things (e.g., living things, non-living things, persons, animal, objects, vehicles, machines) captured within the media item. The content motion may include motion of the thing(s) at a time, over a duration of time, at a location, or over a range of locations. Motion of a thing may include linear (translational) and/or angular (rotational) motion of the thing. For example, content motion may include one or more of linear speed, angular speed, linear acceleration, angular acceleration, linear direction, and/or angular direction of thing(s) within field of view of image capture device(s) during capture of the media item. In some implementations, content motion may include a direction of gravity on the image capture device(s) during capture. The direction of gravity may indicate the motion of the thing(s) with respect to gravity during capture of the media item (e.g., motion away from direction of gravity, motion towards direction of gravity). For instance, content motion may include a thing jumping or being thrown during capture of the media item. Other content motions are contemplated.

In some implementations, the context of a media item may include temporal characteristics, spatial characteristics, environmental characteristics, and/or other characteristics of the media item. Temporal characteristics of the media item may include time that is associated with the media item. Temporal characteristics of the media item may include date and/or time at which the media item was captured (capture time). Spatial characteristics of the media item may include location associated with the media item. Spatial characteristics of the media item may include location (e.g., geo location) at which the media item was captured (capture geo location). Environmental characteristics of the media item may include environmental condition associated with the media item. Environmental characteristics of the media item may include one or more environmental conditions (e.g., weather, season, temperature, precipitation such as rain, snow, hail) during the capture of the media item. Environmental characteristics of the media item may include things in the environment of image capture device during capture of the media item (e.g., surrounding points of interest).

In some implementations, the context of a media item may include qualitative and/or quantitative attribute of the media item. Qualitative attribute may refer to an attribute relating to quality measurement/characteristic of the media item. Quantitative attribute may refer to an attribute relating to quantity measurement/characteristic of the media items. For example, the context of a media item may include resolution, framerate, duration, color properties (e.g., color histogram), and/or other qualitative and/or quantitative attribute of the media item.

In some implementations, one or more context of the media item may be determined based on other context of the media item. For example, the environmental characteristics of the media item may be determined based on the temporal characteristics of the media item (e.g., when the media item was captured) and the spatial characteristics of the media item (e.g., where the media item was captured).

In some implementations, the context of a media item may be identified/generated by a user. For example, a user may be given the option to manually identify the context of the media item. In some implementations, the content of a media item may be stored/presented using human-readable text. For example, the identification of content captured within the media item may be stored/presented using human-readable text, which may allow for searching using text and/or for human validation of the identification (e.g., human validation of an object identified within the media item).

In some implementations, identification of a supplemental media item for inclusion in the list of supplemental media items based on the context of the media items in the sequence of media items may include identification of the supplemental media item based on match in context of the supplemental media items with context of the media items in the sequence of media items. Match in context of the supplemental media items with context of the media items in the sequence of media items may include the context of the supplemental media item being the same as the context of one/some/all of the media items in the sequence of media items. Match in context of the supplemental media items with context of the media items in the sequence of media items may include the context of the supplemental media item being within a threshold value of the context of one/some/all of the media items in the sequence of media items. That is, a supplemental media item may be listed in the list of supplemental media items based on the context of the supplemental media item matching the context of the media items already in the sequence of media items.

For example, particular supplemental media item(s) may be listed in the list of supplemental media items based on match in metadata of the particular supplemental media item(s) with the metadata of the media items in the sequence of media item. Particular supplemental media item(s) may be listed in the list of supplemental media items based on match in capture time (same/similar capture times, overlapping capture times), capture geo location (same/similar geo location), environmental condition (same/similar weather), content (same/similar activity or scenery), qualitative and/or quantitative attribute (same/similar resolution, framerate), and/or other match in context of the supplemental media item(s) with the context of the media items.

In some implementations, the supplemental media item(s) may be identified for inclusion in the list of supplemental media items based on context of one or more of the media items in the sequence of media items that are adjacent to the location (adjacent media item(s)) in the sequence of media items. That is, for the location of the sequence of media items into which the supplemental media item(s) are to be inserted, the supplemental media items may be identified based on the context of media item(s) adjacent to (e.g., preceding, following, surrounding) the location. In such identification of supplemental media item(s), the context of other media items in the sequence of media items may be ignored. Such identification of supplemental media item(s) may enable identification of supplemental media item(s) that are relevant to the context of the media items surrounding the location.

For example, referring to FIG. 3A, the supplemental media item(s) may be identified for inclusion in the location 310. The supplemental media item(s) for the location 310 may be identified based on context of the media items 304, 306. That is, the context of the media items 304, 306 may be used to identify which supplemental media item(s) will be listed in the list of supplemental media items for inclusion in the location 310. The context of the media items 304, 306 may be used to identify which supplemental media item(s) will be suggested for inclusion in the location 310. The context of the media items 302, 308 may not be used in identifying which supplemental media item(s) will be listed in the list of supplemental media items.

In some implementations, the supplemental media item(s) may be identified for inclusion in the list of supplemental media items based on context of one or more of the media items in the sequence of media items that are not adjacent to the location in the sequence of media items (non-adjacent media item(s)). That is, the context of media items not immediately preceding, following, and/or surrounding the location may be used to identify which supplemental media item(s) will be listed in the list of supplemental media items. The context of non-adjacent media items may be used for identification of supplemental media item(s) responsive to an insufficient number of supplemental media items being identified for inclusion in the list of supplemental media items based on the context of the adjacent media item(s) in the sequence of media items. That is, based on less than a desired number (threshold number) of supplemental media items being identified based on the context of adjacent media item, the context of the non-adjacent media items may be used in the identification to increase the number of supplemental media items that are identified.

For example, referring to FIG. 3A, an insufficient number of supplemental media items may be identified based on context of the media items 304, 306. For example, less than a desired/threshold number of supplemental media items may be identified as having context that matches the context of the media items 304, 306. In such a case, the context of the media items 302, 308 may be used to broaden the search for matching supplemental media items.

In some implementations, context of non-adjacent media items may be added for supplemental media item searches in steps. For example, in a sequence of media items including eight media items, the search for supplemental media items may be performed using context of one or two adjacent media items. Responsive to insufficient number of supplemental media items being identified, context of non-adjacent media items may be added to the search. The addition may include (1) context of all other media items in the sequence of media items (e.g., broadening the search to analyze the context of all media times in the sequence) or (2) context of nearby media items in the sequence of media items (e.g., broadening the search to analyze media times adjacent to the adjacent media items). The broadening may incrementally increase the range of media items included in the search so that the context of media items closer to the location are considered before the context of media items farther from the location.

In some implementations, the supplemental media item(s) may be identified for inclusion in the list of supplemental media items based on context of the supplemental media item(s) filling one or more gaps in the context of the media items in the sequence of media items. A gap in the context of the media times may refer to a missing space or a missing interval in the context of the media items. For example, the context of the media items may include capture times that span a range of time. The context of the media items may be missing a particular interval of capture time, and the supplemental media item(s) that were captured during the particular interval of capture time may be identified for inclusion in the list of supplemental media items. As another example, the context of the media items may include capture geo location that cover a range of locations. The context of the media items may be missing a particular location within the range of locations, and the supplemental media item(s) that were captured at the particular location may be identified for inclusion in the list of supplemental media items. For instance, the sequence of media items may include media items captured at different location during a trip from location A to location B. The media items in the sequence may be missing media items captured at locations between the location A and location B. Supplemental media items captured at locations between the location A and location B may be identified for inclusion in the list of supplemental media items.

In some implementations, the supplemental media item(s) may be identified for inclusion in the list of supplemental media items based on both match with one or more context of the media items and based on filling gaps of one or more other context of the media items. For example, the supplemental media item(s) may be identified for inclusion in the list of supplemental media items based on both (1) match in capture geo locations with the media items in the sequence, and (2) for filling one or more missing capture times (e.g., identifying B-roll from same location and different times). As another example, the supplemental media item(s) may be identified for inclusion in the list of supplemental media items based on both (1) match in content type (e.g., travel footage) with the media items in the sequence and (2) for filling one or more missing capture geo locations (e.g., identifying B-roll that matches the theme/story of the media items at different locations, such as identifying B-roll of a travel mode, such as footage of an airport/aerial shots, for a vacation trip video edit). As another example, the supplemental media item(s) may be identified for inclusion in the list of supplemental media items based on both (1) match in capture geo location with the media items in the sequence, and (2) for filling one or more missing capture mode (e.g., identifying B-roll of panning shots/aerial shots to accompany media sequence that includes static shots/land-based shots).

In some implementations, multiple aspects of the context of the media items may be used to generate a spatial representation of the content. For example, use of two different aspects of the context may result in generate of a 2D plot to represent context of the media items, while use of three different aspects of the context may result in generate of a 3D plot to represent context of the media items. Holes in such plot may be used to identify the supplemental media items to be included in the list of supplemental media items. For example, a supplemental media item may be identified based on the context of the supplemental media item filling a hole in the plot of media item context. Supplemental media items that fall outside the plot may not be identified for inclusion in the list of supplemental media items.

In some implementations, the list of supplemental media items may be changed based on user selection of one or more filters. A user may select a filter to include/exclude the filter in identification of supplemental media items for inclusion in the list of supplemental media items. In some implementations, a filter may correspond to a particular aspect of the context of the media items.

In some implementations, a list of filters available for the user selection may be determined based on a privilege associated with a user and/or other information. Different lists of filters may be available to users with different privileges. A privilege of a user may refer to a right of the user. For example, a privilege of a user may refer to access right of the user. In some implementations, a user may be able to acquire (e.g., purchase) different privileges. For example, a user may purchase the ability to use filters/expanded list of filters, and the purchase may result in the privilege of the user being changed to grant access to the filters/expanded list of filters. As another example, users may have different privileges based on whether they are a subscribed member of a service. For example, subscribers to a video hosting/editing service may be provided with access to the filters/expanded list of filters.

In some implementations, multiple sources of supplemental media items may exist. A source of supplemental media item may refer to a grouping of supplemental media items. A source of supplemental media items may refer to an origin from which the supplemental media item was obtained. Multiple sources of supplemental media items may include multiple groupings of supplemental media items. For example, multiple sources of supplemental media items may include a personal source of supplemental media items, a community-shared source of supplemental media items, a basic source of supplemental media items, a premium source of supplemental media items, and/or other sources of supplemental media items.

A personal source of supplemental media items may refer to a source of supplemental media items that includes supplemental media items for a specific user. For example, a personal source of supplemental media items for a user may include supplemental media items captured/uploaded by the user, supplemental media items designated as supplemental media items by the user, and/or other supplemental media items specific to the user.

A community-shared source of supplemental media items may refer to a source of supplemental media items that includes supplemental media items that have been shared by multiple users for use by others. For example, a community-shared source of supplemental media items may include supplemental media items captured/uploaded by multiple users, supplemental media items designated for sharing by multiple users, and/or supplemental media items to be shared among multiple users.

A basic source of supplemental media items may refer to a source of supplemental media items that includes supplemental media items that are available for use by general users. A basic source of supplemental media items may refer to a source of supplemental media items that includes supplemental media items that are available for use by a user without need for a specific privilege. For example, a basic source of supplemental media items may refer to a source of supplemental media items that includes supplemental media items that are available for use by a user without a need for purchase/subscription.

A premium source of supplemental media items may refer to a source of supplemental media items that includes supplemental media items that are available for use by specific users. A premium source of supplemental media items may refer to a source of supplemental media items that includes supplemental media items that are available for use by a user that have a specific privilege. For example, a premium source of supplemental media items may refer to a source of supplemental media items that includes supplemental media items that are available for use by a user that have purchased the access to the supplemental media items and/or have paid for subscription.

In some implementations, supplemental media items from some or all of the different sources may be marked to identify the different sources. For example, supplemental media items from the basic source may not be marked, while supplemental media items from other sources may be marked with tags that identify the sources. Such marking may allow a user to easily identify the source from which the supplemental media items were identified.

In some implementations, which ones of the multiple sources of supplemental media items are searched for identification of the supplemental media item(s) for inclusion in the list of supplemental media items may be determined based on a privilege associated with a user and/or other information. Different privileges of the user may enable searching of different sources of the supplemental media items. For example, whether the supplemental media items are searched for in the basic source alone or in both the basic source and the premium source may depend on the privilege associated with the user.

In some implementations, the supplemental media items may be listed in a particular order in the list based on the source from which the supplemental media items were identified. The ordering of the supplemental media items in the list of supplemental media items may depend on the source from which the supplemental media items were identified. For example, the list of supplemental media items may list supplemental media items identified from the personal source before listing the supplemental media items identified from community-shared source. Other ordering of the supplemental media items based on their sources is contemplated.

In some implementations, a media item may be designated as a supplemental media items based on user designation of the media item. For example, a user may be presented with one or more options to designate a media item as a personal supplemental media item, a community-shared supplemental media item, and/or other supplemental media item. In some implementations, a user may be presented with one or more options to remove designation of a media item as a supplemental media item. In some implementations, removal of designations of a media item as a community-shared supplemental media item may result in automatic modification of media sequences using the media item to remove the media item. In some implementations, removal of designations of a media item as a community-shared supplemental media item may result in the media item no longer being available as a community-shared supplemental media item, but not impacting the media sequences that already includes the media item.

In some implementations, a media item may be automatically identified as a potential supplemental media item based on analysis of the media items, and/or other information. Media item may be analyzed to determine whether the media item includes content that may be used as a supplemental media item (e.g., provides B-roll footage). In some implementations, the context of the media item may be used to identify the media item as a potential supplemental media. In some implementations, the content of the media item may be used to identify the media item as a potential supplemental media. For example, a media item may be identified as a potential supplemental media item based on the media item lacking depiction of people, media item including stable view of a scene, the duration of the media item, and/or other characteristics of the content of the media item. The user may be required to confirm designation of the media item as a supplemental media item for the media times to be designated a supplemental media item.

In some implementations, a user may be required to declare rights to the media item before making the media item a community-shared supplemental media item. For instance, a user may be required to confirm that the user has right to the media item (e.g., when adding a media item with depiction of multiple people asking the user to confirm that the user has rights/necessary agreements to share depictions of the people) and agrees to allow other users to use the media item in their media sequences.

The selection component 106 may be configured to obtain a selection of at least one of the supplemental media item(s) for inclusion in the location in the sequence of media items. That is, the selection component 106 may be configured to obtain a selection of one or more supplemental media items from the list of supplemental media items. The selection may be obtained to include the supplemental media item(s) at the location in the sequence of media items. Obtaining a selection of a supplemental media item may include ascertaining, determining, establishing, identifying, receiving, and/or otherwise obtaining the selection of the supplemental media item.

A supplemental media item may be selected for inclusion in the location in the sequence of media items based on user selection, computer selection, analysis of the supplemental media items, and/or other information. User selection may refer to user input that identifies the supplemental media item(s) to be included at the location in the sequence of media items. For example, a user may have interacted with the graphical user interface 400 shown in FIG. 4 to select the supplemental media items 402, 404 for inclusion in the location 310 in the sequence of media items 300 (shown in FIG. 3A) or for inclusion in the location 360 in the sequence of media items 350 (shown in FIG. 3B). Computer selection may refer to automatic selection of a supplemental media item based on one or more rules/factors. Computer selection of a supplemental media item may be performed based on analysis of the supplemental media items and/or other information. Analysis of the supplemental media items may refer to examination, evaluation, processing, studying, and/or other analysis of one or more features/characteristics of the supplemental media items. For example, one or more supplemental media items may be automatically selected based on feature(s)/characteristic(s) of the supplemental media items.

In some implementations, which ones of the supplemental media items listed in the list of supplemental media items are selectable may be determined based on a privilege associated with a user and/or other information. Different privileges of the user may enable selection of supplemental media items from different sources. Including the supplemental media items that are available with different privileges may encourage/provide incentive for the users to obtain the privileges required to select them. For instance, supplemental media items outside the privilege of a user may be greyed out in the list, allowing the user to see how many other supplemental media items may be available with different privileges.

The modification component 108 may be configured to modify the sequence of media items. The sequence of media items may be modified to include at least one of the supplemental media item(s) selected for inclusion in the location in the sequence of media items. That is, the modification component 108 may be configured to modify the sequence of media items by including (inserting) the selected supplemental media item(s) at the location in the sequence of media items. The inclusion (insertion) of the supplemental media items may modify the sequence of media items.

Figure 5A:
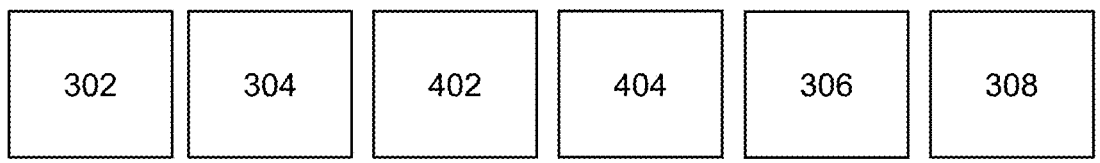
FIG. 5A illustrates an example modified sequence of media items.

FIG. 5A illustrates an example modified sequence of media items 500. Based on selection of the supplemental media items 402, 404 for inclusion in the location 310, the sequence of media items 300 (thumbnail representation of the media items) may be modified so that the modified sequence of media items 500 includes the supplemental media items 402, 404 between the media items 304, 306.

Figure 5B:
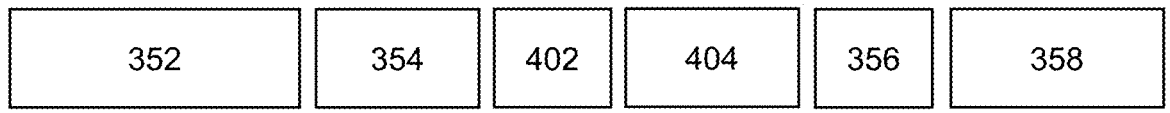
FIG. 5B illustrates an example modified sequence of media items.

FIG. 5B illustrates an example modified sequence of media items 550. Based on selection of the supplemental media items 402, 404 for inclusion in the location 360, the sequence of media items 350 (timeline representation of the media items) may be modified so that the modified sequence of media items 550 includes the supplemental media items 402, 404 between the media items 354, 356. Other modifications of the sequence of media items are contemplated.

In some implementations, different modifications of the sequence of media items may be enabled for different privileges associated with a user and/or other information. For example, a user with no/basic privilege may be allowed to temporarily modify the sequence of media items to include the supplemental media item(s) (e.g., view the media sequence with the supplemental media item(s) in a preview, remove the media sequence after a certain amount of time), while a user with premium privilege may be allowed to permanently modify the sequence of media items to include the supplemental media item(s) (e.g., for storage, for viewing, for sharing). A user with no/basic privilege may be allowed to modify the sequence of media items to include the supplemental media item(s) a limited number of times, while a user with premium privilege may be allowed to modify the sequence of media items to include the supplemental media item(s) without any limitation on the number of times such sequences are generated. A user with no/basic privilege may be allowed to modify the sequence of media items to include a limited number of supplemental media items, while a user with premium privilege may be allowed to modify the sequence of media items without any restriction on the number of supplemental media item included.

A user with no/basic privilege may be allowed to generate the sequence of media items to include lower fidelity version of the media items/supplemental media items (e.g., generate low-quality video edit with the supplemental footage), while a user premium privilege may be allowed to generate the sequence of media items to include higher fidelity version of the media items/supplemental media items (e.g., generate high-quality video edit with the supplemental footage).

In some implementations, modification of a sequence of media items using supplemental media item(s) may be provided for manual user control. For example, a user may interact with a graphical user interface to select/generate a sequence of media items. The graphical user interface may provide option(s) for the user to see a list of supplication media items that may be inserted into the sequence of media items. The graphical user interface may provide option(s) for the user selected the desired supplemental media item(s), and the sequence of media items may be modified to include the selected supplemental media item(s).

In some implementations, modification of a sequence of media items using supplemental media item(s) may be provided automatically to a user. For example, a media sequence that includes the supplemental media item(s) may be automatically generated and provided for view (e.g., preview) by the user. For instance, a sequence of media items generated by the user may be automatically modified to include supplemental media item(s). A sequence of media items may be automatically modified by a computing device to include supplemental media item(s) without any user input. The modified sequence may be presented to the user for viewing. Such automatic modification of sequence of media items may encourage the user to manually generate other sequences that include supplemental media item(s)/ encourage the user to obtain privilege required to generate sequences including supplemental media item(s).

In some implementations, the supplemental media item(s) selected for inclusion in the location in the sequence of media items may be automatically modified to match one or more characteristics of one or more media items in the sequence of media items. For example, visual characteristics, audio characteristics, and/or other characteristics of the supplemental media item(s) may be modified to be the same as/similar to the visual characteristics, audio characteristics, and/or other characteristics of the media item(s) in the sequence of media items. For instance, media item(s) in the sequence may have certain visual/audio characteristics based on capture of the media item(s) using a particular capture device and/or processing of the media items after capture. The supplemental media item(s) may have different visual/audio characteristics based on capture of the media item(s) using a different capture device and/or different processing of the supplemental media item(s) after capture.

Inclusion of the supplemental media items with different visual/audio characteristics may result in abrupt transitions in the sequence. Modifying the supplemental media item(s) to have matching (e.g., consistent) visual/audio characteristics with the media items in the sequence may create a more cohesive sequence. For example, media items in the sequence may have been modified by applying filter(s) and making certain styles of edits. If the applied filter(s) and styles of edits are consistent through the sequence (e.g., applied to all media items in the sequence, applied to threshold number/ratio of media items the sequence), the filter(s) and the styles of edits may be made to the supplemental media item(s) inserted into the sequence.

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible (non-transitory) machine-readable storage medium may include read only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

Although processor 11 and electronic storage 13 are shown to be connected to interface 12 in FIG. 1, any communication medium may be used to facilitate interaction between any components of system 10. One or more components of system 10 may communicate with each other through hard-wired communication, wireless communication, or both. For example, one or more components of system 10 may communicate with each other through a network. For example, processor 11 may wirelessly communicate with electronic storage 13. By way of non-limiting example, wireless communication may include one or more of radio communication, Bluetooth communication, Wi-Fi communication, cellular communication, infrared communication, or other wireless communication. Other types of communications are contemplated by the present disclosure.

Although the processor 11 is shown in FIG. 1 as a single entity, this is for illustrative purposes only. In some implementations, the processor 11 may comprise a plurality of processing units. These processing units may be physically located within the same device, or the processor 11 may represent processing functionality of a plurality of devices operating in coordination. The processor 11 may be configured to execute one or more components by software; hardware; firmware; some combination of software, hardware, and/or firmware; and/or other mechanisms for configuring processing capabilities on the processor 11.

It should be appreciated that although computer components are illustrated in FIG. 1 as being co-located within a single processing unit, in implementations in which the processor 11 comprises multiple processing units, one or more of computer program components may be located remotely from the other computer program components. While computer program components are described as performing or being configured to perform operations, computer program components may comprise instructions which may program processor 11 and/or system 10 to perform the operation.

While the computer program components are described herein as being implemented via processor 11 through machine readable instructions 100, this is merely for ease of reference and is not meant to be limiting. In some implementations, one or more functions of computer program components described herein may be implemented via hardware (e.g., dedicated chip, field-programmable gate array) rather than software. One or more functions of computer program components described herein may be software-implemented, hardware-implemented, or software and hardware-implemented.

The description of the functionality provided by the different computer program components described herein is for illustrative purposes, and is not intended to be limiting, as any of computer program components may provide more or less functionality than is described. For example, one or more of computer program components 102 and/or 104 may be eliminated, and some or all of its functionality may be provided by other computer program components. As another example, the processor 11 may be configured to execute one or more additional computer program components that may perform some or all of the functionality attributed to one or more of computer program components 102 and/or 104 described herein.

The electronic storage media of the electronic storage 13 may be provided integrally (i.e., substantially non-removable) with one or more components of the system 10 and/or as removable storage that is connectable to one or more components of the system 10 via, for example, a port (e.g., a USB port, a Firewire port, etc.) or a drive (e.g., a disk drive, etc.). The electronic storage 13 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. The electronic storage 13 may be a separate component within the system 10, or the electronic storage 13 may be provided integrally with one or more other components of the system 10 (e.g., the processor 11). Although the electronic storage 13 is shown in FIG. 1 as a single entity, this is for illustrative purposes only. In some implementations, the electronic storage 13 may comprise a plurality of storage units. These storage units may be physically located within the same device, or the electronic storage 13 may represent storage functionality of a plurality of devices operating in coordination.

Figure 2:
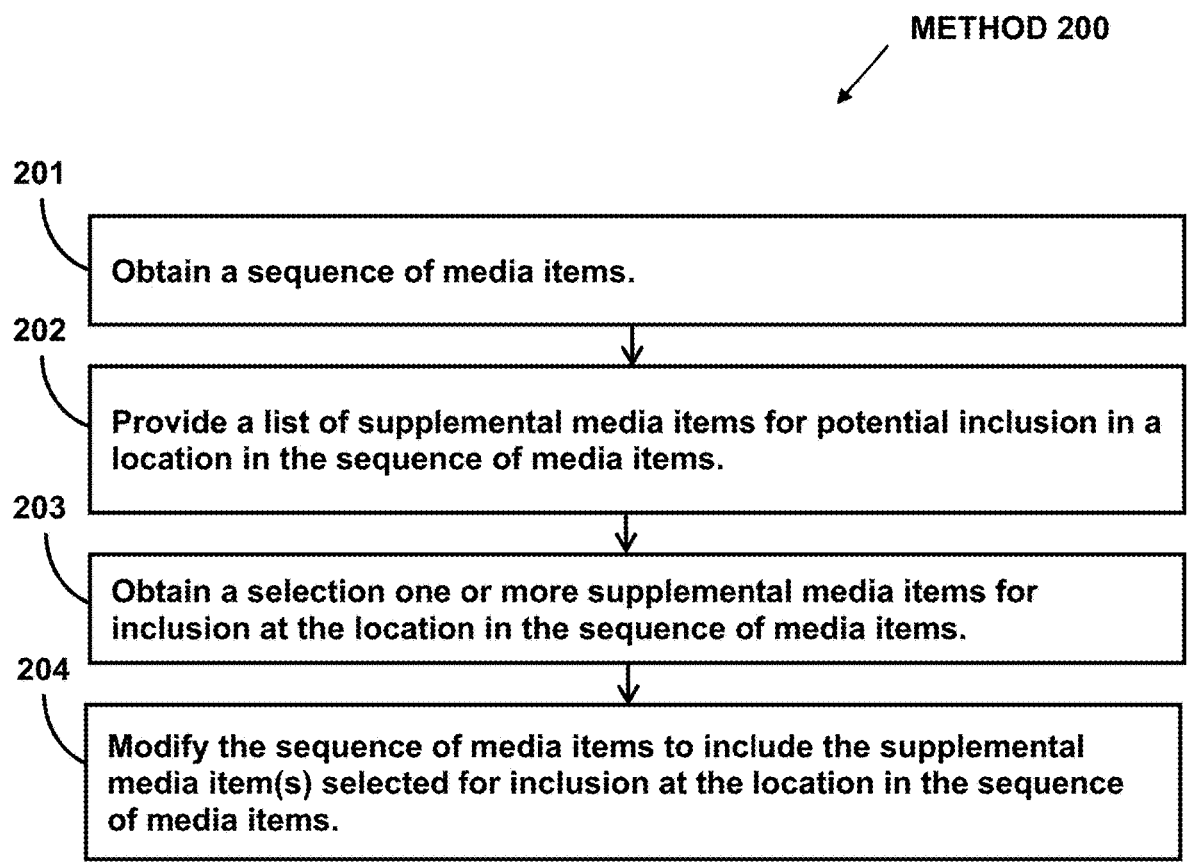
FIG. 2 illustrates a method for providing supplemental content for use in a video edit.

FIG. 2 illustrates method 200 for sharing capture settings for visual content capture. The operations of method 200 presented below are intended to be illustrative. In some implementations, method 200 may be accomplished with one or more additional operations not described, and/or without one or more of the operations discussed. In some implementations, two or more of the operations may occur substantially simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operation of method 200 in response to instructions stored electronically on one or more electronic storage media. The one or more processing devices may include one or more devices configured through hardware, firmware, and/or software to be specifically designed for execution of one or more of the operations of method 200.

Referring to FIG. 2 and method 200, at operation 201, a sequence of media items may be obtained. The sequence of media items may include media items ordered in a sequence. In some implementations, operation 201 may be performed by a processor component the same as or similar to the media component 102 (Shown in FIG. 1 and described herein).

At operation 202, a list of supplemental media items for potential inclusion in a location in the sequence of media items may be provided. The list of supplemental media items may include one or more supplemental media items that provide a view of one or more things not provided by the sequence of media items. In some implementations, operation 202 may be performed by a processor component the same as or similar to the supplemental media component 104 (Shown in FIG. 1 and described herein).

At operation 203, a selection of at least one of the supplemental media item(s) for inclusion in the location in the sequence of media items may be obtained. In some implementations, operation 203 may be performed by a processor component the same as or similar to the selection component 106 (Shown in FIG. 1 and described herein).

At operation 204, the sequence of media items may be modified to include at least one of the supplemental media item(s) selected for inclusion in the location in the sequence of media items. In some implementations, operation 204 may be performed by a processor component the same as or similar to the modification component 108 (Shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system for providing supplemental content for use in a video edit, the system comprising:
one or more physical processors configured by machine-readable instructions to:
obtain a sequence of media items, the sequence of media items including media items ordered in a sequence;
provide a list of supplemental media items for potential inclusion in a location in the sequence of media items based on context of the media items in the sequence of media items, the context of the media items in the sequence of media items including temporal, spatial, and/or environmental characteristics of one or more of the media items in the sequence of media items, the list of supplemental media items including one or more supplemental media items that provide a view of one or more things not provided by the sequence of media items, wherein a given supplemental media item is identified for inclusion in the list of supplemental media items based on context of the given supplemental media item filling one or more gaps in context of the
media items in the sequence of media items, a given
gap in the context of the media items in the sequence
of media items including missing temporal, spatial,
and/or environmental characteristics between the
temporal, spatial, and/or environmental characteristics of the media items in the sequence of media
items, and wherein the temporal, spatial, and/or
environmental characteristics of the given supplemental media item matches the missing temporal,
spatial, and/or environmental characteristics
between the temporal, spatial, and/or environmental
characteristics of the media items in the sequence of
media items;

obtain a selection of at least one of the one or more
supplemental media items for inclusion in the location in the sequence of media items; and modify the sequence of media items to include the at
least one of the one or more supplemental media
items selected for inclusion in the location in the
sequence of media items;

wherein:

the one or more supplemental media items are identified for inclusion in the list of supplemental media
items based on context of one or more of the media
items in the sequence of media items that are adjacent to the location in the sequence of media items,
the sequence of the media items including a first
media item preceding the location and a second
media item following the location, the one or more
supplemental media items are identified for inclusion
in the list of supplemental media items based on
context of the first media item and/or the second
media item, the one or more supplemental media
items are not identified for inclusion in the list of
supplemental media items based on context of other
media items in the sequence of the media items; and the one or more supplemental media items are identified for inclusion in the list of supplemental media
items based on context of one or more of the media
items in the sequence of media items that are not
adjacent to the location in the sequence of media
items responsive to an insufficient number of supplemental media items being identified for inclusion in
the list of supplemental media items based on the
context of the one or more of the media items in the
sequence of media items that are adjacent to the
location in the sequence of media items, wherein the
one or more supplemental media items are identified
for inclusion in the list of supplemental media items
based on the context of the other media items in the
list of supplemental media items responsive to a
number of supplemental media items that are identified for inclusion in the list of supplemental media
items based on the context of the first media item
and/or the second media item being less than a
threshold number.

2. The system of claim 1, wherein context of a given
media item includes a capture time and/or a capture geo
location.

3. The system of claim 2, wherein the context of the given
media item further includes an environmental condition
during capture of the given media item.

4. The system of claim 2, wherein the context of the given
media item further includes visual content and/or audio
content of the given media item.

5. The system of claim 1, wherein the list of supplemental
media items is changed based on user selection of one or
more filters, further wherein a list of filters available for the
user selection is determined based on a privilege associated
with a user.

6. The system of claim 1, wherein multiple sources of
supplemental media items exist, and which ones of the
multiple sources of supplemental media items are searched
for identification of the one or more supplemental media
items for inclusion in the list of supplemental media items is
determined based on a privilege associated with a user.

7. The system of claim 1, wherein visual and/or audio
characteristics of the at least one of the one or more
supplemental media items selected for inclusion in the
location in the sequence of media items are automatically
modified to match the visual and/or audio characteristics of
at least one of the media items in the sequence of media
items.

8. A method for providing supplemental content for use in
a video edit, the method performed by a computing system
including one or more processors, the method comprising:

obtaining, by the computing system, a sequence of media
items, the sequence of media items including media
items ordered in a sequence;

providing, by the computing system, a list of supplemental media items for potential inclusion in a location in
the sequence of media items based on context of the
media items in the sequence of media items, the context
of the media items in the sequence of media items
including temporal, spatial, and/or environmental characteristics of one or more of the media items in the
sequence of media items, the list of supplemental
media items including one or more supplemental media
items that provide a view of one or more things not
provided by the sequence of media items, wherein a
given supplemental media item is identified for inclusion in the list of supplemental media items based on
context of the given supplemental media item filling
one or more gaps in context of the media items in the
sequence of media items, a given gap in the context of
the media items in the sequence of media items including missing temporal, spatial, and/or environmental
characteristics between the temporal, spatial, and/or
environmental characteristics of the media items in the
sequence of media items, and wherein the temporal,
spatial, and/or environmental characteristics of the
given supplemental media item matches the missing
temporal, spatial, and/or environmental characteristics
between the temporal, spatial, and/or environmental
characteristics of the media items in the sequence of
media items;

obtaining, by the computing system, a selection of at least
one of the one or more supplemental media items for
inclusion in the location in the sequence of media
items; and modifying, by the computing system, the sequence of
media items to include the at least one of the one or
more supplemental media items selected for inclusion
in the location in the sequence of media items wherein:

the one or more supplemental media items are identified for inclusion in the list of supplemental media
items based on context of one or more of the media
items in the sequence of media items that are adjacent to the location in the sequence of media items,
the sequence of the media items including a first
media item preceding the location and a second media item following the location, the one or more supplemental media items are identified for inclusion in the list of supplemental media items based on context of the first media item and/or the second media item, the one or more supplemental media items are not identified for inclusion in the list of supplemental media items based on context of other media items in the sequence of the media items; and the one or more supplemental media items are identified for inclusion in the list of supplemental media items based on context of one or more of the media items in the sequence of media items that are not adjacent to the location in the sequence of media items responsive to an insufficient number of supplemental media items being identified for inclusion in the list of supplemental media items based on the context of the one or more of the media items in the sequence of media items that are adjacent to the location in the sequence of media items, wherein the one or more supplemental media items are identified for inclusion in the list of supplemental media items based on the context of the other media items in the list of supplemental media items responsive to a number of supplemental media items that are identified for inclusion in the list of supplemental media items based on the context of the first media item and/or the second media item being less than a threshold number.

9. The method of claim 8, wherein context of a given media item includes a capture time and/or a capture geo location.

10. The method of claim 9, wherein the context of the given media item further includes an environmental condition during capture of the given media item.

11. The method of claim 9, wherein the context of the given media item further includes visual content and/or audio content of the given media item.

12. The method of claim 8, wherein the list of supplemental media items is changed based on user selection of one or more filters, further wherein a list of filters available for the user selection is determined based on a privilege associated with a user.

13. The method of claim 8, wherein multiple sources of supplemental media items exist, and which ones of the multiple sources of supplemental media items are searched for identification of the one or more supplemental media items for inclusion in the list of supplemental media items is determined based on a privilege associated with a user.

14. The method of claim 8, wherein visual and/or audio characteristics of the at least one of the one or more supplemental media items selected for inclusion in the location in the sequence of media items are automatically modified to match the visual and/or audio characteristics of at least one of the media items in the sequence of media items.

15. A system for providing supplemental content for use in a video edit, the system comprising:
one or more physical processors configured by machine-readable instructions to:
obtain a sequence of media items, the sequence of media items including media items ordered in a sequence;
provide a list of supplemental media items for potential inclusion in a location in the sequence of media items based on context of the media items in the sequence of media items, the context of the media items in the sequence of media items including temporal, spatial, and/or environmental characteristics of one or more of the media items in the sequence of media items, the list of supplemental media items including one or more supplemental media items that provide a view of one or more things not provided by the sequence of media items, wherein a given supplemental media item is identified for inclusion in the list of supplemental media items based on context of the given supplemental media item filling one or more gaps in context of the media items in the sequence of media items, a given gap in the context of the media items in the sequence of media items including missing temporal, spatial, and/or environmental characteristics between the temporal, spatial, and/or environmental characteristics of the media items in the sequence of media items, and wherein the temporal, spatial, and/or environmental characteristics of the given supplemental media item matches the missing temporal, spatial, and/or environmental characteristics between the temporal, spatial, and/or environmental characteristics of the media items in the sequence of media items;
obtain a selection of at least one of the one or more supplemental media items for inclusion in the location in the sequence of media items; and
modify the sequence of media items to include the at least one of the one or more supplemental media items selected for inclusion in the location in the sequence of media items;
wherein:
the one or more supplemental media items are identified for inclusion in the list of supplemental media items based on context of one or more of the media items in the sequence of media items that are adjacent to the location in the sequence of media items, the sequence of the media items including a first media item preceding the location and a second media item following the location, the one or more supplemental media items are identified for inclusion in the list of supplemental media items based on context of the first media item and/or the second media item, the one or more supplemental media items are not identified for inclusion in the list of supplemental media items based on context of other media items in the sequence of the media items;

the one or more supplemental media items are identified for inclusion in the list of supplemental media items based on context of one or more of the media items in the sequence of media items that are not adjacent to the location in the sequence of media items responsive to an insufficient number of supplemental media items being identified for inclusion in the list of supplemental media items based on the context of the one or more of the media items in the sequence of media items that are adjacent to the location in the sequence of media items, wherein the one or more supplemental media items are identified for inclusion in the list of supplemental media items based on the context of the other media items in the list of supplemental media items responsive to a number of supplemental media items that are identified for inclusion in the list of supplemental media items based on the context of the first media item and/or the second media item being less than a threshold number; and multiple sources of supplemental media items exist, and which ones of the multiple sources of supplemental media items are searched for identification of the one or more supplemental media items for inclusion in the list of supplemental media items is determined based on a privilege associated with a user.

16. The system of claim 15, wherein context of a given media item includes a capture time and/or a capture geo location.

17. The system of claim 16, wherein the context of the given media item further includes an environmental condition during capture of the given media item.

18. The system of claim 16, wherein the context of the given media item further includes visual content and/or audio content of the given media item.

19. The system of claim 15, wherein the list of supplemental media items is changed based on user selection of one or more filters, further wherein a list of filters available for the user selection is determined based on the privilege associated with the user.

20. The system of claim 15, wherein visual and/or audio characteristics of the at least one of the one or more supplemental media items selected for inclusion in the location in the sequence of media items are automatically modified to match the visual and/or audio characteristics of at least one of the media items in the sequence of media items.

* * * * *